United States Patent
Faccin

(10) Patent No.: US 7,460,378 B2
(45) Date of Patent: Dec. 2, 2008

(54) OVERLOAD PROTECTION ARRANGEMENT FOR ELECTRONIC CONVERTERS, FOR INSTANCE FOR HALOGEN LAMPS

(75) Inventor: Marco Faccin, Caerano (IT)

(73) Assignee: Patent-Treuhand-Gesellschaft fur Elektrisch Gluhlampen mbH, Munich (DE)

( * ) Notice: Subject to any disclaimer, the term of this patent is extended or adjusted under 35 U.S.C. 154(b) by 158 days.

(21) Appl. No.: 11/359,447

(22) Filed: Feb. 23, 2006

(65) Prior Publication Data
US 2006/0203399 A1    Sep. 14, 2006

(30) Foreign Application Priority Data
Mar. 9, 2005    (EP)    ................... 05425133

(51) Int. Cl.
   *H02H 7/122*    (2006.01)
(52) U.S. Cl. ..................... 363/56.07; 361/15
(58) Field of Classification Search ........... 363/50, 363/52, 56.07, 56.08, 62, 63, 98, 106, 123, 363/124, 125, 127; 315/119, 127, 225; 361/15, 361/160
   See application file for complete search history.

(56) References Cited

U.S. PATENT DOCUMENTS

| 3,953,783 | A | * | 4/1976 | Peters, Jr. ................... 363/124 |
| 5,050,060 | A | * | 9/1991 | Geuns ......................... 363/126 |
| 5,149,995 | A | * | 9/1992 | Hofgraff ..................... 327/440 |
| 5,422,546 | A | * | 6/1995 | Nilssen ....................... 315/219 |
| 5,589,740 | A | * | 12/1996 | Rudolph et al. ............. 315/291 |
| 5,604,419 | A | * | 2/1997 | Bisschop et al. ............ 320/150 |
| 5,657,211 | A | * | 8/1997 | Brockmann .................. 363/16 |
| 5,818,225 | A | * | 10/1998 | Miekley et al. ............. 324/251 |
| 5,825,136 | A | * | 10/1998 | Rudolph ..................... 315/291 |
| 5,949,154 | A | * | 9/1999 | Williams ..................... 307/64 |
| 5,956,240 | A | * | 9/1999 | Williams .................. 363/21.16 |
| 6,021,037 | A | * | 2/2000 | Hasler ........................ 361/106 |
| 6,891,487 | B2 | * | 5/2005 | Leung et al. ................ 341/120 |
| 2003/0123203 | A1 | * | 7/2003 | Telefus et al. ................ 361/58 |

FOREIGN PATENT DOCUMENTS

| EP | 0 674 084 | 9/1995 |
| EP | 0 800 334 | 10/1997 |
| EP | 0 825 806 | 2/1998 |

OTHER PUBLICATIONS

"Electromagnetic compatibility (EMC) requirements for rectifier installations", W. Sammet et al., Published in the journal paper Elektrie, 2000 vol. 54, No. 7-9, p. 258-263.

* cited by examiner

*Primary Examiner*—Akm E Ullah
*Assistant Examiner*—M'Baye Diao
(74) *Attorney, Agent, or Firm*—Carlo S. Bessone

(57) ABSTRACT

A circuit arrangement for protecting an electronic converter against overloads includes:
   a low impedance path selectively activatable to prevent ignition of the electronic converter, the low impedance path including an electronic switch,
   a control capacitor whose charge voltage controls the electronic switch, whereby the electronic switch is activated to prevent ignition of the electronic converter when the charge voltage of the control capacitor is above a given threshold,
   a first generator for loading the control capacitor, the first generator activatable in the presence of a first overload condition of the electronic converter, and
   a second generator for further loading the control capacitor, the second generator activatable in the presence of a second overload condition of the electronic converter, the second overload condition being heavier than the first overload condition.

18 Claims, 2 Drawing Sheets

Figure 1:
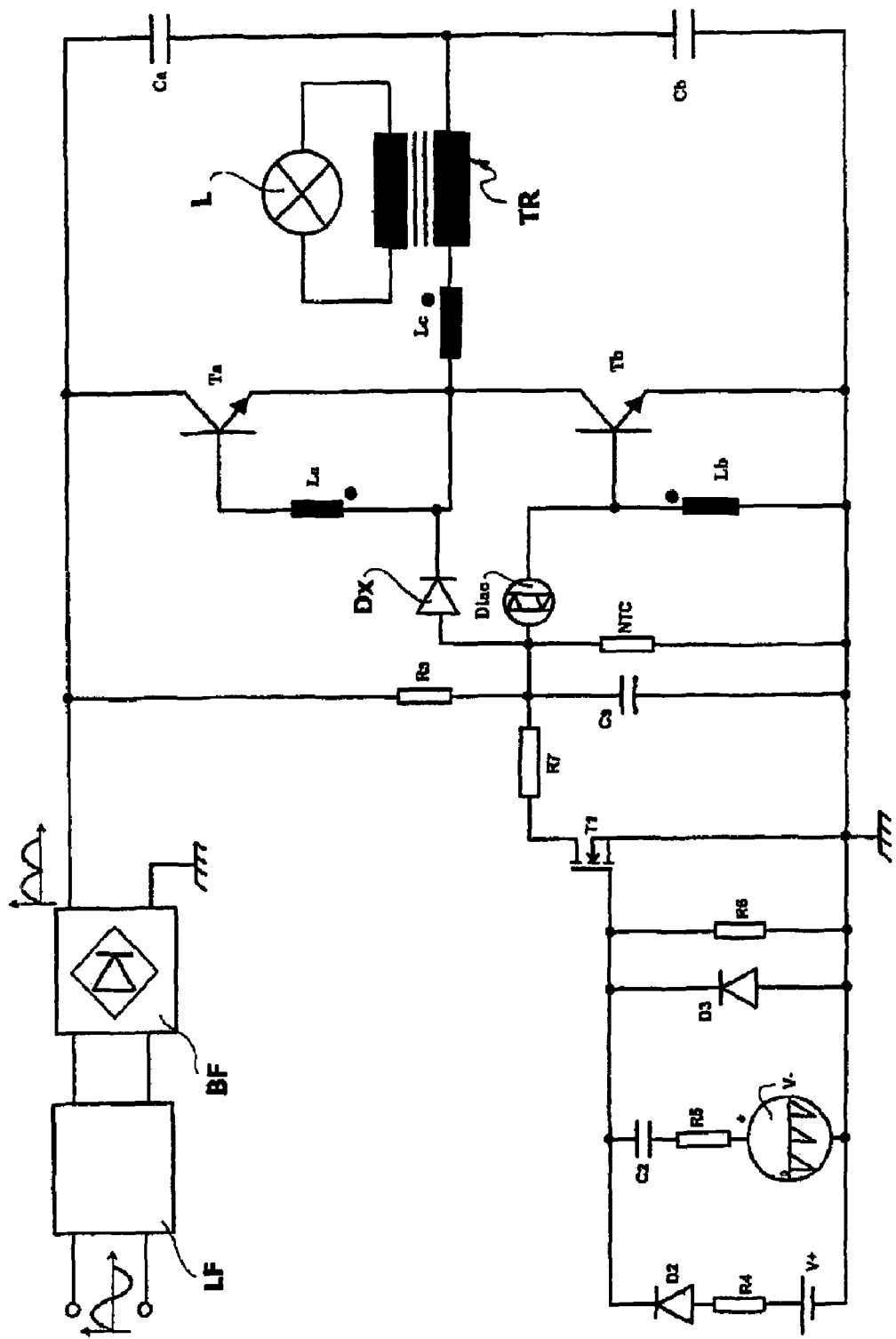

OVERLOAD PROTECTION ARRANGEMENT FOR ELECTRONIC CONVERTERS, FOR INSTANCE FOR HALOGEN LAMPS

FIELD OF THE INVENTION

The invention relates to arrangements for protecting electronic converters against current overloads, and was developed by paying specific attention to the possible use in protecting against current overloads electronic converters for halogen lamps.

DESCRIPTION OF THE RELATED ART

Electronic converters (typically used for supplying 12 V halogen lamps) have to comply with norms and/or regulations that make it necessary to ensure safe operation even in the presence of abnormal working conditions, such as, e.g., an output current load higher than the nominal load. Moreover, automatic restart after abnormal working conditions is needed.

An electronic converter is essentially intended as an AC/AC converter that provides, by means of an electronic circuit, a high frequency, insulated low voltage used to supply 12 V halogen lamps. When abnormal operating conditions are expected, in the absence of any kind of protection, over-dimensioned components must be used in order to avoid major damage resulting from over-heating and/or over-currents. Otherwise there might be no compliance with security and/or performance requirements.

A common protection arrangement adopted in the art involves sensing any over-current flowing in the active components inside the so-called Electronic Control Gear (ECG) of the converter. The most commonly used topology for these devices is an auto-oscillating half-bridge with two Bipolar Junction Transistors (BJT). A sensing resistor applied between emitter and ground of the low side transistor represents a typical solution that provides a voltage proportional to the low-side transistor current (which is in turn proportional to half the load current). In that way, abnormal operating conditions of the device can be detected. A capacitor is charged with the voltage generated by the sensing resistor and, when this voltage exceeds a threshold value, an active element "switches off" the device until the subsequent discharge of the capacitor brings back the voltage below the threshold. The discharge time may be quite long (at least some hundreds of ms), thus making it practically mandatory to use electrolytic or tantalum capacitors, which may result in a notable limitation in the lifetime of the ECG.

Additionally, such an arrangement exhibits strong limitations when the nominal power of the ECG is in the medium-high range (more than 100 W). Using a high-value sensing resistor would lead to excessive losses in the sensing resistor itself (which will in turn imply loss of efficiency) and undesirably large dimensions. This in turn makes it impossible to detect light (i.e. moderate) current overload conditions, i.e. those instances where the load remains between the nominal value and twice that value.

In more complicated protection arrangements, two separate stages are dedicated to detecting light overload conditions and substantial current overload conditions (more than twice the nominal current load until short circuit), respectively. Essentially, in these arrangements, two signals are generated and used to charge two different capacitors that may actuate two separate active protection elements.

EP-A-0 647 084 discloses an electrical circuit arrangement for operating low-voltage halogen filament lamps, comprising an input filter, a rectifier arrangement, a trigger generator, a half-bridge converter with a control transformer, a power transformer and a sensor circuit for overload or short-circuit detection. The latter comprises a sensor diode and a serial sensor resistor parallel with the bridge capacitor. At the connection point between the sensor diode and the sensor resistor, a sensor signal is tapped which drives the switch-off element. The optional second sensor circuit comprises a secondary winding of the control transformer and an additional winding and generates a sensor signal. This permits the separate detection of overload and short-circuit conditions with a correspondingly optimised switch-off behaviour.

EP-A-0 800 334 discloses a circuit arrangement for operating electrical lamps having a temperature sensor (NTC) as a component in an over-heating protection circuit and at least one additional thermal component. In the event of an overload, this is traversed by a current having a higher intensity than in the case of normal operation and is thereby heated. The thermal component (for example one or more heating resistors), is thermally coupled to the temperature sensor (NTC); as a result the over-heating protection circuit is consequently also triggered in the event of an overload.

EP-A-0 825 806 discloses a circuit arrangement for operating electrical incandescent bulbs, particularly low-volt halogen incandescent bulbs. The circuit comprises an inverter with a half-bridge circuit and an overload detector circuit. This includes a current-voltage transformer, e.g., a resistance, which is serially connected between a first half-bridge capacitor and ground potential. The current-voltage transformer controls a signal-conditioning and cutoff circuit, which switches off the inverter at least temporarily in the case of overload or short circuit. Preferably, the current-voltage transformer of the overload detector circuit is a component of a frequency adaptation circuit, which opposes a decrease in the frequency of the inverter in the upper power connection range. This variant is particularly cost-favorable, since in this case, no additional component is required for detector circuit.

Finally, the paper "Electromagnetic compatibility (EMC) requirements for rectifier installations" by W. Sammet et al., published in the journal paper Elektrie, 2000 vol. 54, no. 7-9, p. 258-63, generally discusses EMC requirements for variable speed electric motor drives, with emphasis on requirements for RF interference warning labels. This paper also deals with NTC thermistor-based overload protection elements. Thermistor circuit characteristics are presented, and advantages of NTC thermistors in achieving soft start for motors, as well as reduced mains wave form distortion, and lower RF emission, are presented. Details are given of a range of thermistor elements, in connection with applications in switching regulators, motor controls, fluorescent lamp drivers and in the protection of transformers.

OBJECT AND SUMMARY OF THE INVENTION

While the arrangements disclosed in the last-cited documents effectively tackle the various problems outlined in the foregoing, the need is still felt for further improved arrangements.

The object of the present invention is thus to provide a converter protection arrangement adapted to fully satisfactorily meet the requirements set forth in the foregoing.

According to the present invention, that object is achieved by means of an arrangement having the features set forth in the claims that follow. The claims form an integral part of the disclosure of the invention provided herein.

A preferred embodiment of the invention is thus a circuit arrangement for protecting an electronic converter against overloads, including:

- a low impedance path selectively activatable to prevent ignition of the electronic converter, the low impedance path including an electronic switch,
- a control capacitor whose charge voltage controls the electronic switch, whereby the electronic switch is activated to prevent ignition of the electronic converter if the charge voltage of the control capacitor is above a given threshold,
- a first generator for charging the control capacitor, activatable in the case of a first current overload condition of the electronic converter, and
- a second generator for further charging the control capacitor, activatable in the case of a second overload condition of the electronic converter, the second overload condition being heavier (e.g., involving a higher current) than the first overload condition.

Typically, the first generator and the second generator are configured for charging the control capacitor as long as the electronic converter is ignited. In the case of the second overload condition, the charge voltage of the control capacitor thus reaches a higher level and remains above the given threshold for a longer time than in the case of the first overload condition. In the case of the second overload condition, the electronic switch that controls ignition of the converter is thus activated to prevent ignition of the electronic converter for a longer time than in the case of the first overload condition.

Preferably, the electronic converter is subject to ignition at each half-cycle of a respective supply signal. The electronic switch is activatable to prevent ignition of the electronic converter for a given half-cycle of the supply signal if the charge voltage of the capacitor is above said given threshold at the beginning of said given half-cycle.

The arrangements referred to in the foregoing avoid that too high temperatures may be reached in the active components within the Electronic Control Gear (ECG) when a short circuit or in general an current overload is applied at its output, e.g. due to a wrong installation. Furthermore, in the case of a current overload, an intermittent brightness in the lamps permits the user to notice the abnormal conditions. In this way he or she can become aware of the problem and dispense with the source thereof.

Essentially, the arrangement described herein provides for the integration to single stage of a plurality of distinct stages that make it possible to distinguish a heavy abnormal condition or a light current overload. In a particularly preferred embodiment, two signals from an intermediate point of the coupling capacitors and from a diode in parallel with the capacitors co-operate in charging only one capacitor whose charge voltage in turn activates only one active element to switch off (i.e. shut down) the ECG. The active element can have high input impedance, whereby the value of the capacitance can be reduced. This makes it possible to avoid using electrolytic or tantalum capacitors and has the evident advantage of saving space and number of components. Additionally, any limit in the lifetime of the ECG likely to derive from the use of these types of capacitors is dispensed with.

In a particularly preferred embodiment, a low-moderate current overload condition is detected by sensing the voltage ripple at an intermediate point of the coupling capacitors, while a higher current overload is detected when the diode in parallel with the low-side coupling capacitor starts conducting.

BRIEF DESCRIPTION OF THE ANNEXED DRAWINGS

Figure 2:
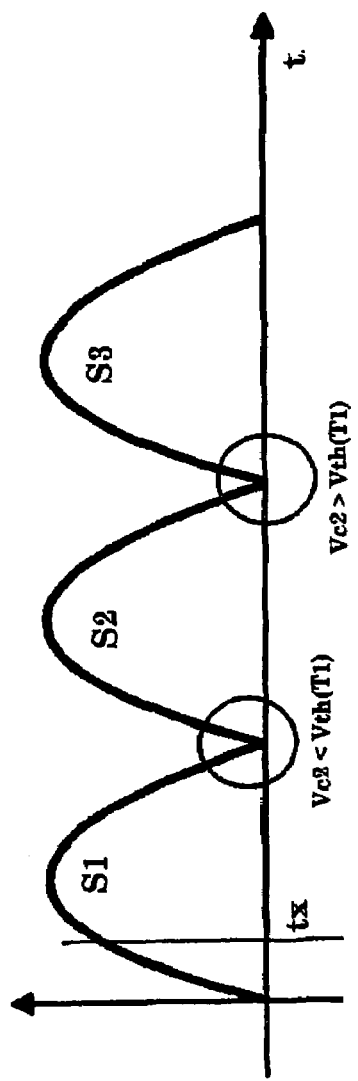
Figure 3:
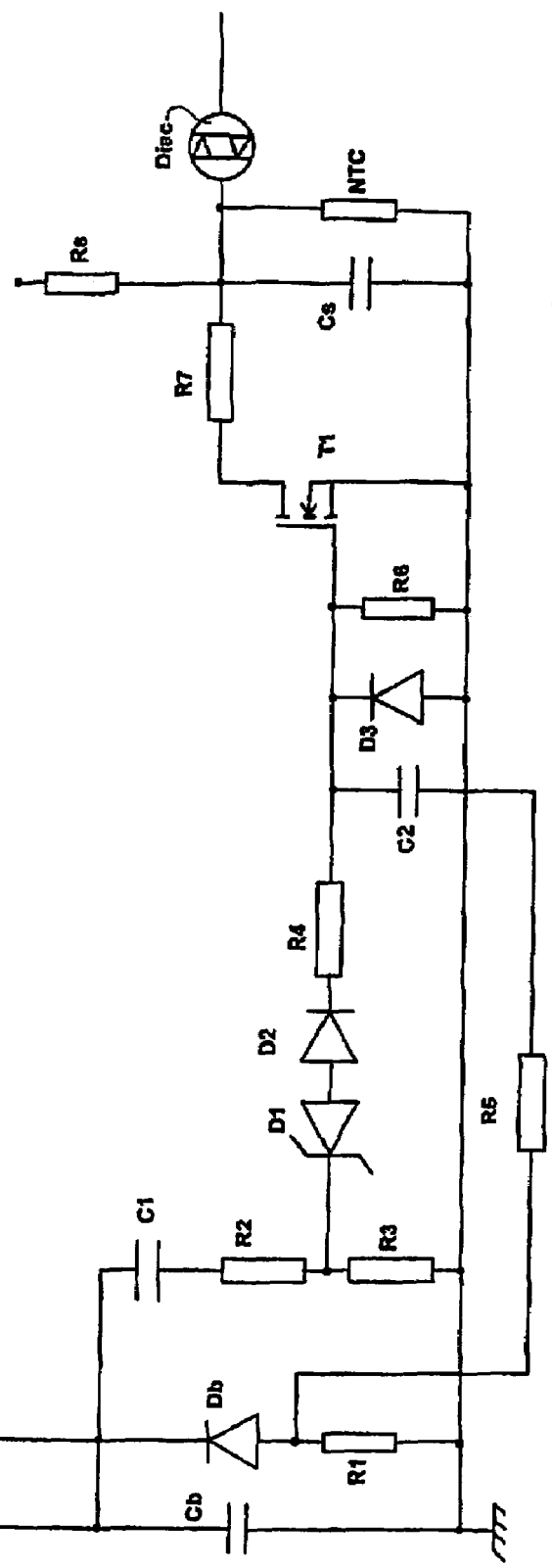

The invention will now be described, by way of example only, with reference to the annexed figures of drawing, wherein;

FIG. 1 is a first block diagram exemplary of the basic principle of the invention, FIG. 2 is a diagram representative of the time behaviour of a signal generated within the circuit of the block diagram of FIG. 1, and FIG. 3 is a further, more detailed block diagram exemplary a possible practical embodiment of the invention.

DETAILED DESCRIPTION OF EXEMPLARY EMBODIMENTS OF THE INVENTION

FIG. 1 shows the basic structure of an electronic converter as described herein.

In the exemplary embodiment shown, the converter is used to feed one ore more 12V halogen lamps L via the secondary winding of a transformer TR. Such an electronic converter for 12 V halogen lamps is based on the use of a controlled semiconductor switch such as e.g. a Diac, which is normally supplied an ac line voltage (i.e. the mains voltage) via a line filter LF and a bridge rectifier BF which supplies an oscillating half-bridge typically comprised of two electronic switches such as two bipolar transistors Ta and Tb.

More in detail, the connection point of the emitter of the high-side transistor Ta and the collector of the low-side transistor Tb is used to drive the primary winding of the transformer TR.

The Diac is interposed between the base of the low-side transistor Tb and the anode of a diode Dx whose anode is connected to the connection point of the emitter of the high-side transistor Ta and the collector of the low-side transistor Tb.

La, Lb are representative of impedances currently associated with i) the line between the base of the high-side transistor Ta and the connection point of the emitter of the high-side transistor Ta and the collector of the low-side transistor Tb, and ii) the line between the base and the emitter of the low-side transistor Tb. Lc represents a small current transformer that drives the transistors Ta, and Tb and thus controls the power transformer TR.

Finally, Ca and Cb are the coupling capacitors of the half bridge that comprise the classical topology of the ECG just described.

It will be appreciated that the arrangement of parts so far described is per se conventional in the art, thus making it unnecessary to provide a more detailed description herein.

The arrangements of the type just disclosed do not include large capacitance values after the bridge rectifier. Therefore they need a re-ignition after the zero crossing of the supply voltage.

This re-ignition action is performed by means of a RC network connected to the gate of the Diac. The RC network in question includes a resistor Rs that charges a capacitor Cs until its voltage reaches the threshold of the Diac; after that the half-bridge is ignited and keeps on working until the next zero crossing of the supply voltage occurs.

Connected in parallel to the capacitor Cs is a negative temperature coefficient thermal resistor NTC that provides the normal thermal protection required in electronic converters for 12 V halogen lamps. Ignition of the Diac can be prevented by shorting the capacitor Cs via a low impedance path including a resistor R7 and a transistor (typically a mosfet transistor) T1 acting as an electronic switch. As long as the transistor T1 is activated (i.e. the switch closed by making the transistor T1 conductive or saturated) the resistor R7—having a generally low value such as e.g. about 1 kOhm—is shorted to ground and makes it impossible for the charge voltage across the capacitor Cs to reach the 32 V level necessary to ignite the Diac, thus the ECG shown remains off.

References V+ and V− indicate two voltage generators that contribute together to charge a capacitor C2.

Specifically, the generator V+ is series-connected with a resistor R4 and a diode D2. The generator V− is in turn series-connected with a resistor R5 and a capacitor C2. As shown in FIG. 1, the two circuit branches including the voltage generators V+ and V− are arranged in parallel with each other and further in parallel to a resistor R6 and a diode D3 connected between the gate of the Diac and ground.

The diodes D2 and D3 have their cathodes connected (i.e. coming down) to the gate of the Diac.

As better detailed in the following, the generator V− will be activated in the presence of heavy abnormal conditions like a short circuit or, for example, an output current higher than twice the nominal load.

Conversely, the generator V+ will already be activated in the presence of a slightly higher current load than the nominal current load.

In this case the generator V+ will charge the capacitor C2 via the resistor R4 and the diode D2, and the resulting voltage across the resistor R6 exceeds the threshold of the transistor T1, the transistor T1 will be activated.

This event will cause the switch off of the ECG until the control capacitor C2 discharges (this will essentially be only through the resistor R6, due to the presence of the diodes D2 and D3) to the extent that its charge voltage drops below the threshold of the transistor T1. Thereafter, following the transistor T1 being cut-off, the ECG turns on again.

If the current overload leading to the generator V+ being activated does not disappear, the capacitor C2 is always recharged and a new cycle is started. Due to the high impedance exhibited by the transistor T1 the capacitance of the capacitor C2 can be kept at a value that makes possible to use normal film capacitors.

Additionally, this behaviour with short re-ignitions followed by longer interruptions in the oscillating operation of the ECG, leads to the temperatures of the active power components remaining low; this avoids possible damage due to overheating. Furthermore, this behaviour is made evident by a flashing (blinking) of the lamps, which can warn the user that an abnormal situation is present.

When the current overload, i.e. the output current intensity, is too high (till a short circuit) it becomes necessary to have a longer time between the re-ignition of the ECG in order to avoid overheating of the power components; so a higher charge of the capacitor C2 is necessary.

With heavier abnormal conditions also the generator V− is activated and further charge flows in the capacitor C2 through the loop formed by the resistor R5 and the diode D3. In this way a higher voltage appears through the control capacitor C2 and a longer time is necessary to discharge it during the working interruption.

The charging process of the control capacitor C2 can be best understood by referring to the time diagram of FIG. 2. This shows the typical time behaviour of the voltage signal fed to the half bridge comprised of the two transistors Ta and Tb.

If, during a half-period S1, for example at the time tx, a current overload appears, the generator(s)—namely V+ or both V+ and V− depending on the nature of the overload—will start charging the capacitor C2 through the resistor R4 (or both resistors R4 and R5).

Assuming that at the end of the half period S1 the charge voltage Vc2 on the capacitor C2 (to be more precise, the voltage across the resistor R6) is still lower than the threshold voltage Vth of the mosfet T1, the half-bridge will re-start to work (i.e. to provide a non-zero output signal) at the beginning of the half-period S2 and further charge will flow in the capacitor C2.

This may lead, at the end of the half period S2, to the voltage across the resistor R6 (and thus essentially the charge voltage Vc2 on the capacitor C2) becoming higher than the threshold voltage Vth of the mosfet T1, whereby the mosfet T1 becomes active.

This event causes the switch off of the ECG, whereby during the half-period S3 the charge voltage Vc2 of C2 will start to decrease as the capacitor C2 discharge. As indicated, this is essentially only through the resistor R6, because of the presence of the diodes D2 and D3. The charge voltage Vc2 on the capacitor C2 will then decrease to below the threshold of the mosfet T1. The ECG will then be turned on again from the subsequent half-period.

Those of skill in the art will promptly appreciate that the charge voltage Vc2 on the capacitor C2 and the voltage across the resistor R6 are related to each other just by a scaling factor. For that reason these two voltages can be referred to indifferently as the entity controlling activation/de-activation of the mosfet T1.

Stated otherwise, in the arrangement shown, the behaviour of the ECG (operation or switch off) over a whole half period will be dictated by whether the charge voltage Vc2 on the capacitor C2 (i.e. the voltage across the resistor R6) is lower or higher than the threshold of the mosfet T1 at the beginning (i.e. the initial zero crossing) of the half period I question.

For instance, the ECG will work through one full half-period, even though the voltage across through R6 has reached the threshold voltage of the transistor T1 in the meantime, e.g. during that very half-period. In fact the ECG will be switched off only at the end of that half period. As a consequence of this, the voltage on C2 will be in a position to further increase to an amount dictated by whether V+ only or V+ and V− jointly are activated. The time during which the ECG will be switched off will thus depend (also) from the amount of the current overload and thus represent an indication of such an overload and the nature thereof.

In other words, in the arrangement shown the first generator V+ and the second generator V− are configured for charging the control capacitor C2 as long as the electronic converter is ignited. As a consequence, the control capacitor C2 will reach different levels of charge voltage Vc2 in the presence of a first, moderate overload condition and a second, heavier overload condition, respectively.

Specifically, in the embodiment shown, the electronic converter is subject to ignition at each half-cycle (S1, S2, S3) of the respective, half-rectified supply signal, and the mosfet T1 is activatable to prevent ignition of the electronic converter for a given half-cycle of the supply signal if the charge voltage Vc2 of the control capacitor C2 is above a given threshold at the beginning (i.e., at the starting zero crossing point) of that half-cycle.

The time constant introduced by R4 and R5 during the charge of C2 is necessary to take into account the (transient) current overload caused by the very low filament resistance of the halogen lamps during their ignition, when the filament is cold, which results in a current having a value higher that the expected nominal value. This delay introduced in the charge of C2 makes it possible to switch on the ECG also with the nominal load.

The block diagram of the FIG. 3 further details a possible practical embodiment of the arrangement already described in connection with FIG. 1. Certain elements shown in FIG. 1 have been omitted from FIG. 3 for the sake of clarity of presentation.

Essentially, the block diagram of FIG. 3 details possible embodiments of the generators V+ and V−. For that reason, components, parts and elements identical or equivalent to those already described in connection with FIG. 1 have been designated in FIG. 2 with the same references and will not be described again.

Two diodes Da and Db are typically coupled to the capacitors Ca and Cb in order to avoid that the voltage at the intermediate point between the capacitors Ca and Cb goes too high or too low when the half-bridge starts to resonate in the presence of too low resistance at the output, which means too big load applied.

In fact, the electronic converters for halogen lamps of the type exemplified herein, the behaviour of the voltage at the intermediate point of the coupling capacitors Ca and Cb is strongly dependent on the output load.

This voltage is affected by an amplitude- and frequency-modulated high-frequency ripple that depends both on the amplitude of the supply voltage and on the load applied at the output. This dependence can be used to drive the generator V+.

If the current overload in terms of output current is very high (up to a short circuit) the voltage at the intermediate point of the coupling capacitors Ca and Cb can reach zero and, in this case, the diode Db start conducting, this causing a negative voltage to appear through a resistor R1 connected in series to the diode Db. This dependence can be used to drive the generator V−.

Sensing of the voltage at the intermediate point of the coupling capacitors Ca and Cb to drive the generator V+ is realized by means of a high-pass network formed by a capacitor C1 and two resistors R2 and R3.

Essentially the capacitor C1 and two resistors R2 and R3 are connected to the intermediate point of the coupling capacitors Ca and Cb in the form of a voltage divider of which the capacitor C1 plus the resistor R2 and the resistor R3 form the upper and the lower branch, respectively.

A first role of the capacitor C1 is to block the low frequency component of the ripple at the intermediate point of the coupling capacitors Ca and Cb; in that way the voltage through the series of R2 and R3 includes only the high frequency ripple. The two resistors R2 and R3 thus act a voltage divider to scale the voltage applied to a Zener diode D1 which in fact acts as the voltage source for the voltage generator V+.

The impedance (reactance) of C1 is frequency dependent and thus the signal through R3 can depend on the operating frequency of the device.

In fact, the module of the voltage through R3 is equal to:

$$|VR3| = |Vcb| * \frac{\omega * C1 * R3}{\sqrt{1 + \omega^2 * C1^2 * (R2 + R3)^2}},$$

where $\omega = 2*\pi*f$ and f is the frequency.

If the term $\omega*C1*(R2+R3)$ is much smaller than 1, the formula will depend directly on the frequency. A decrease of $\omega=2*\pi*f$, due to a bigger current load, will compensate the bigger value of the ripple Vcb. Since the higher the current load, the lower the frequency, the voltage across R3 could be lower even when the current overload becomes higher.

It is possible to avoid this phenomenon by devising the characteristics of the RC network comprised of the capacitor C1 and the resistors R2 and R3 by locating the pole with the characteristic frequency $$Fp = \frac{1}{2*\pi*C_1*(R_2 + R_3)}$$

between the low modulating frequency and the much higher working frequency which is normally more than 30-40 kHz.

In that way, the capacitor C1 becomes only a coupling capacitor that blocks the low frequency portion of the signal but has no effect on the high frequency signal applied through R3. In fact, the network made of C1, R2 and R3 forms a high pass filter with the characteristic frequency Fp. Since the operating frequency is higher than Fp, there is no attenuation of the signal coming from the capacitor Cb Independently of the working frequency, when the load is too high, the voltage through R3 becomes higher than the threshold voltage of the Zener diode D1. A this point the Zener diode D1 starts operating as an ideal voltage source and the capacitor C2 is charged until its voltage reaches the threshold of the transistor T1. The ECG shuts down until the discharge of C2 brings its voltage again below the threshold of T1.

If during this interval the current overload condition does not disappear, the ECG switches on for a short time and then shuts down again.

As the current overload becomes higher, the ripple at the intermediate point of the capacitors Ca and Cb becomes more significant causing the voltage through the coupling capacitors Da and Db to reach zero and/or the actual supply voltage.

When such a condition is reached, the clamping diodes Da and Db start conducting, and the ripple across the resistor R3 cannot increase although more power is required at the output. This means that the network comprised of C1, R2, R3 and D1 may not ensure a thoroughly satisfactory protection at high current overload conditions.

In the situation just outlined, the diodes Da and Db start conducting. When the diode Db in parallel with the low-side coupling capacitor Cb starts conducting, a negative voltage appears across the resistor R1.

The resistor R1 thus plays the role of the voltage generator V− described in the foregoing. Additional charge can thus flow in the capacitor C2 increasing its charge voltage as described previously. This makes the pauses between the re-ignitions of the device longer and permits to avoid possible damage due to overheating of the active components.

Resistor R3 can be replaced by a resistor with a positive temperature coefficient (PTC). Thus the overload protection becomes temperature dependent. Then, at high temperatures less overload is needed to reduce the power delivered to the lamp. This can result into a blinking lamp that indicates a failure status. Resistor R3 can also be replaced by a PTC and a parallel connected normal resistor, that linearizes the PTC characteristic.

Instead of the replacement of resistor R3 with an PTC, resistor R2 can be replaced by a resistor with negative temperature coefficient. This leads to the same effect. If the modified resistor R3 or R2 accomplish a required temperature protection, the NTC in parallel to capacitor Cs can be omitted.

The invention claimed is:

1. A circuit arrangement for protecting an electronic converter against overloads, the arrangement including:
   a low impedance path selectively activatable to prevent ignition of said electronic converter, said low impedance path including an electronic switch, wherein said electronic converter is subject to ignition at each half-cycle of a respective supply signal and wherein said electronic switch is activatable to prevent ignition of said electronic converter for a given half-cycle of said supply signal if the charge voltage of said control capacitor is above said predetermined threshold at the beginning of said given half-cycle;
   a control capacitor whose charge voltage controls said electronic switch, wherein said low impedance path is activated to prevent ignition of said electronic converter if the charge voltage of said control capacitor is above a predetermined threshold;
   a first generator for charging said control capacitor, said first generator activatable in the case of a first current overload condition of said electronic converter; and
   a second generator for further charging said control capacitor, said second generator activatable in the case of a second overload condition of said electronic converter, said second overload condition being heavier than said first overload condition, wherein said first generator and said second generator are configured for charging said control capacitor as long as said electronic converter is ignited, wherein in the case of said second overload condition, the charge voltage of said control capacitor reaches a higher level and remains above said predetermined threshold thus keeping said electronic switch activated to prevent ignition of said electronic converter for a longer time than in the case of said first overload condition.

2. The arrangement of claim 1, characterized in that:
   said electronic converter is subject to ignition at each half-cycle of a respective supply signal; and
   said electronic switch is activatable to prevent ignition of said electronic converter for a given half-cycle of said supply signal if the charge voltage of said control capacitor is above said given threshold at the beginning of said given half-cycle.

3. The arrangement of claim 1, characterized in that said low impedance path includes a shorting resistor to be selectively shorted by said electronic switch.

4. The arrangement of claim 1, characterized in that said electronic switch includes a transistor, such as a mosfet transistor.

5. The arrangement of claim 1, characterized in that said first generator and said second generator are coupled to respective resistors to delay the charging of said control capacitor during cold start ignition of said electronic converter.

6. The arrangement of claim 1, characterized in that it includes coupling capacitors to said electronic converter, said coupling capacitors having an intermediate point therebetween, as well as respective diodes coupled to said coupling capacitors to control the voltage at said intermediate point, whereby said voltage is affected by an amplitude- and frequency-modulated ripple, the arrangement including circuitry to drive said first generator as a function of said ripple.

7. The arrangement of claim 6, characterized in that said circuitry to drive said first generator includes a high-pass network to block the low frequency part of said ripple.

8. The arrangement of claim 6, characterized in that said circuitry to drive said first generator includes a voltage divider to scale the voltage applied to said first generator.

9. The arrangement of claim 8, characterized in that said voltage divider is temperature dependent.

10. The arrangement of claim 6, characterized in that said first generator includes a Zener diode connected via said circuitry to said intermediate point between said coupling capacitors.

11. The arrangement of claim 1, characterized in that it includes coupling capacitors to said electronic converter, said coupling capacitors having an intermediate point therebetween, as well as respective diodes coupled to said coupling capacitors to control the voltage at said intermediate point, wherein one of said diodes has an associated sensing resistor, wherein the voltage across said sensing resistor drives said second generator.

12. The arrangement of claim 11, characterized in that said sensing resistor is connected between ground and the anode of the one of said diodes coupled with the lowside capacitor of said coupling capacitors, whereby, in the case of said second overload condition, a negative voltage appears across said sensing resistor, said sensing resistor thus comprising said second generator.

13. The arrangement of claim 1, characterized in that said low impedance path includes a shorting resistor to be selectively shorted by said electronic switch.

14. The arrangement of claim 2, characterized in that said low impedance path includes a shorting resistor to be selectively shorted by said electronic switch.

15. The arrangement of claim 7, characterized in that said circuitry to drive said first generator includes a voltage divider to scale the voltage applied to said first generator.

16. The arrangement of claim 7, characterized in that said first generator includes a Zener diode connected via said circuitry to said intermediate point between said coupling capacitors.

17. The arrangement of claim 8, characterized in that said first generator includes a Zener diode connected via said circuitry to said intermediate point between said coupling capacitors.

18. The arrangement of claim 9, characterized in that said first generator includes a Zener diode connected via said circuitry to said intermediate point between said coupling capacitors.

* * * * *